United States Patent
Sinha et al.

(10) Patent No.: US 6,615,857 B1
(45) Date of Patent: Sep. 9, 2003

(54) MODULAR FLOW CONTROL ACTUATOR

(75) Inventors: Neeraj Sinha, Ivyland, PA (US); Srinivasan Arunajatesan, Flemington, NJ (US)

(73) Assignee: Combustion Research and Flow Technology, Inc., Pipersville, PA (US)

( * ) Notice: Subject to any disclaimer, the term of this patent is extended or adjusted under 35 U.S.C. 154(b) by 0 days.

(21) Appl. No.: 10/224,963

(22) Filed: Aug. 21, 2002

(51) Int. Cl.⁷ .............................................. G05D 7/01
(52) U.S. Cl. ...................... 137/14; 137/833; 137/825; 137/803; 239/DIG. 3; 239/DIG. 7; 181/220; 181/296; 244/1 N
(58) Field of Search ................... 137/833, 14, 825, 137/803; 239/DIG. 3, DIG. 7; 244/204, 207, 1 N; 181/296, 220

(56) References Cited

U.S. PATENT DOCUMENTS

| | | | |
|---|---|---|---|
| 3,542,152 A | * 11/1970 | Adamson | 181/59 |
| 3,826,331 A | * 7/1974 | Scharton et al. | 181/220 |
| 4,052,002 A | * 10/1977 | Stouffer et al. | 239/4 |
| 4,151,955 A | * 5/1979 | Stouffer | 239/11 |
| 4,703,904 A | 11/1987 | Haslund | |
| 5,050,805 A | 9/1991 | Lloyd et al. | |
| 5,069,397 A | 12/1991 | Haslund | |
| 5,092,425 A | * 3/1992 | Shaw, Jr. | 181/213 |
| 5,362,179 A | 11/1994 | Sirovich et al. | |
| 5,595,205 A | 1/1997 | Sirovich et al. | |
| 5,797,414 A | 8/1998 | Sirovich et al. | |
| 5,983,944 A | 11/1999 | Niv | |
| 6,206,326 B1 | 3/2001 | Stanek et al. | |
| 6,296,202 B1 | 10/2001 | Stanek | |
| 6,375,118 B1 | 4/2002 | Kibens et al. | |
| 6,379,110 B1 | 4/2002 | McCormick et al. | |
| 6,390,418 B1 | 5/2002 | McCormick et al. | |

OTHER PUBLICATIONS

Hutchins et al. The Modulated Ultrasonic Whistle as an Acoustic Source for Modeling J. Acoustic Soc. Am. 73(1), Jan., 1983.

Kastner et al. Development and Characterization of Hartmann Tube Based Actuators for High Speed Flow Control Technical Report AIAA–2002–0128, 40th Aerospace Sciences Meeting, Jan. 14–17, 2001.

* cited by examiner

Primary Examiner—A. Michael Chambers
(74) Attorney, Agent, or Firm—Michael G. Grilly, Esq.

(57) ABSTRACT

The present invention is a flow control actuator capable of exciting a fluid via the coupling of edge tones generated along a wedge and resonance generated within a cavity. The invention consists of a resonance cavity and ejector port separated by a wedge with fluid flow provided by a pressurized cavity and directed through a throat over the wedge. Several actuators may be arranged independently or in a coupled arrangement to generate a pulsed fluid field of desired shape.

17 Claims, 8 Drawing Sheets

MODULAR FLOW CONTROL ACTUATOR

FEDERALLY SPONSORED RESEARCH OR DEVELOPMENT

The United States Government has, a paid-up license in this invention and the right in limited circumstances to require the patent owner to license others on reasonable terms as provided for by the terms of F33615-01-M-3137 awarded by the United States Air Force.

CROSS REFERENCE TO RELATED APPLICATIONS

None.

BACKGROUND OF THE INVENTION

1. Field of the Invention

The present invention generally relates to a flow control actuator capable of exciting a fluid so to produce a high-frequency, pulsed stream. Specifically, the invention excites a fluid via resonance produced within a cavity and edge tones generated along a wedge adjacent to the resonance cavity.

2. Background

The suppression of turbulence is a major challenge in aero-optics, acoustics, and dispensing as each relates to aircraft applications. In aero-optic applications, the integration of a directed energy device onto an aircraft platform requires the attenuation, and preferably elimination, of undesired turbulent structures that degrade both intensity and coherence of a beam projected from an uncovered bay or a covered bay with optically transmissible cover. Acoustic suppression of engine noise is critical to the safe and effective operation of both military and civilian aircraft in urban areas and desirable from a low-observable perspective in military applications. The dispensing of weapons from an open bay or cavity requires the alternation of a pressure field having a negative to-positive gradient along the bay length thereby kicking the tail of the weapon downwards and the nose upwards after release so to cause contact between aircraft and weapon.

The suppression of turbulence is achievable by either low-frequency or high-frequency actuation. Low-frequency actuation techniques are provided in the related arts for turbulence control within cavities. Low-frequency actuation attempts to alter or suppress the growth of spatially evolving, large-scale turbulent structures within the cavity shear layer. This approach is best described as mode competition whereby the primary objective is energy removal from targeted modes. However, low-frequency actuation often results in the redistribution of energy into other modes without overall attenuation. Consequently, low-frequency forcing often dampens one tone thereby failing to suppress other naturally occurring tones. Furthermore, the forcing frequency is quite often close to the natural modes so that when cavity modes drift one or more of the resonant modes are excited creating even higher acoustic loads.

In contrast, high-frequency actuation represents a strategy whereby the shear layer turbulence dissipation mechanism is directly excited by forcing near "Kolmogorov" -like frequencies thereby suppressing all modes by dissipation of the overall acoustic energy. Large scale vortical structures are replaced by fine-grain turbulence, accompanied by the attenuation of the dynamic load. In cavity applications, fine-grain turbulence attenuates the growth rate of large scale vortical structures and weakens the cavity feedback loop. Whereas in aero-optics applications, it is understood that fine grain turbulence is well with the realm of adaptive optics.

High frequency actuation is achievable via a pulsed airstream. Kibens et al., U.S. Pat. No. 6,375,118 issued Apr. 23, 2002, describes a Hartmann tube attached to a high-pressure (80–120 psi) chamber for attenuating engine noise and reducing turbulence in a cavity. FIG. 1 shows the device described in Kibens et al. whereby air is directly forced into a tube. Kibens' tube is based on classical designs described by Hutchins et al. in *The Modulated Ultrasonic Whistle as an Acoustic Source for Modeling*, J. Acoustic Soc. Am. 73(1), January 1983, and later by Kastner et al. in *Development and Characterization of Hartmann Tube Based Fluidic Actuators for High Speed Flow Control*, Technical Report No. AIAA-2002-0128 presented at the $40^{th}$ Aerospace Sciences Meeting and Exhibit, Jan 14–17, 2001.

The operating frequency (f) of a Hartmann tube is approximated by the equation $$f=c/(4L)$$

thereby practically constrained by tube length (L) and sound speed (c) of the gas within the tube. The approximation assumes all waves are Mach waves and flow velocity within the tube is negligible. Operating frequencies in the range of 2500 to 5000 Hz are described by Kibens et al.

What is currently required is a high-frequency actuator capable of generating high-quality, high-amplitude, high-frequency tones, while minimizing mass flow rate, for the purpose of attenuating turbulence in aero-optic, acoustic suppression, and weapon dispensing applications. What is required is a device capable of producing high-quality, high amplitude, high-frequency tones exceeding those achievable with a classic Hartmann tube. Furthermore, what is required is a device capable of producing a higher-pressure, pulsed fluid than achievable with a classic Hartmann tube.

SUMMARY OF THE INVENTION

An object of the present invention is a device capable of generating a high-quality, high-amplitude, high-frequency tone for the purpose of attenuating turbulence.

A further object of the present invention is a device producing a pulsed fluid stream via a resonance cavity augmented by edge tones.

The present invention is comprised of an inlet port, a stagnation chamber attached to the inlet port thereby providing passage of the fluid into the stagnation chamber, a wedge separating a resonance cavity and an ejector port, and a throat directing fluid from the stagnation chamber across the wedge thereby producing edge tones. The stagnation chamber is pressurized by fluid flow through the inlet port. Fluid from the stagnation chamber passes through a throat and directed across a wedge so that a portion of the fluid flows into the resonance cavity and the remainder through the ejector port exiting the actuator. In preferred embodiments, approximately one-half of the fluid is directed by the wedge into the resonance cavity and the remainder into the ejector port.

The cyclic pressurization and depressurization of the resonance cavity establishes an oscillating shock wave in the resonance tube. In the first half of the oscillation, the resonance cavity is pressurized and a shock is developed traveling into the cavity. In the second half of the oscillation, the shock is reversed so to travel back along the cavity purging the cavity after the shock reaches the opening into the cavity. Back flow from the resonance cavity establishes an unsteady vortex at the corner of the wedge further augmenting frequencies in the fluid expelled from the ejector tube.

Fluid flow over the wedge adjacent to the resonance cavity further augments frequencies within the fluid expelled from the ejector port. A vortex or swirl is created as fluid flows away from the throat in a turbulent fashion and towards the wedge thereby resulting in flow along one side of the wedge. The resulting pressure generated by this flow condition causes the redirection of one or more subsequent vortices thereby resulting in fluid flow along the opposite side of the wedge. This periodic realignment of flow from side-to-side is often referred to as flipping and produces an edge tone. Fluid flipping adjacent to the resonance cavity causes a corresponding variation in pressure which is magnified by resonance when the pressure variation has a component at the resonant frequency of the cavity. The result is a feedback loop of higher pressure, increased flipping, and greater resonance which may lock the fluid frequency to the resonance frequency of the cavity.

Alternate embodiments of the present invention include linear arrangements and circular arrangements of two or more actuators. For example, several actuators may be aligned in a linear fashion with separate inlet ports or a single plenum so to produce a planar flow of excited fluid. Alternately, a plurality of actuators may be arranged to form a single ring with a common plenum or separate inlet ports. Furthermore, a plurality of independently driven actuators may be arranged in a circular fashion so to impinge a column of fluid.

Several advantages are offered by the present invention. The invention provides higher pulse frequencies than achievable with a resonance cavity alone. The invention provides higher pressures within the excited fluid than achievable with a resonance cavity alone. The invention provides tunable control over the frequency characteristics of the excited fluid.

BRIEF DESCRIPTION OF THE DRAWINGS

The invention will now be described in more detail, by way of example only, with reference to the accompanying drawings, in which.

REFERENCE NUMERALS

Figure 1:
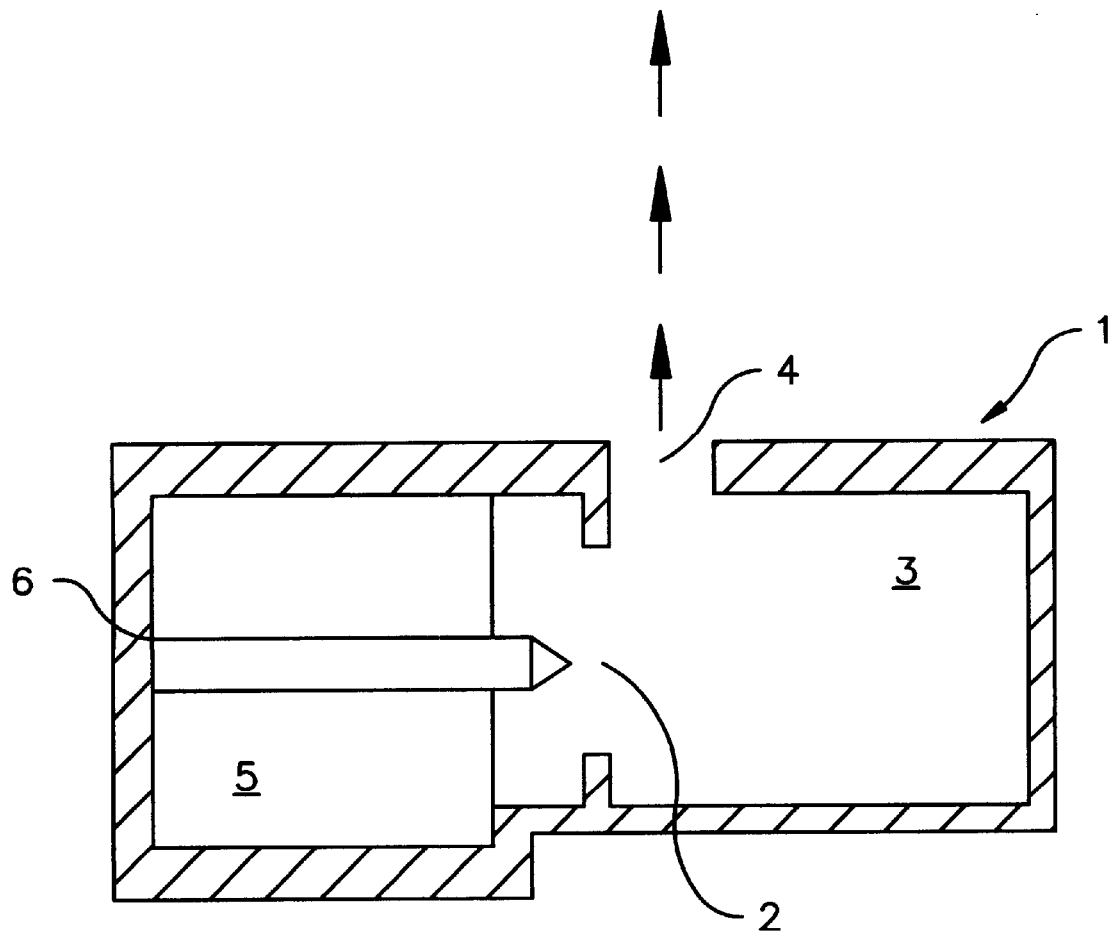
FIG. 1 is a section view of a resonance device described in the related arts.

1 Hartmann tube
2 Inlet port
3 Resonance cavity
4 Outlet port
5 Pressurized chamber
6 Needle
9 Multi-actuator assembly
10 Actuator
11 Resonance cavity
12 Inlet port
13 Stagnation chamber
14 Wedge
15 Throat
16 Hole
17 Plenum
18 Ejector port
19 Aero-optic cover
20 Cover plate
21 Fastener
22 Duct
23 Bay
24 Structure
25 Nozzle
26 Structure
27 Aero-optic cover
28 Opening
30 Width

DESCRIPTION OF THE INVENTION

Figure 2:
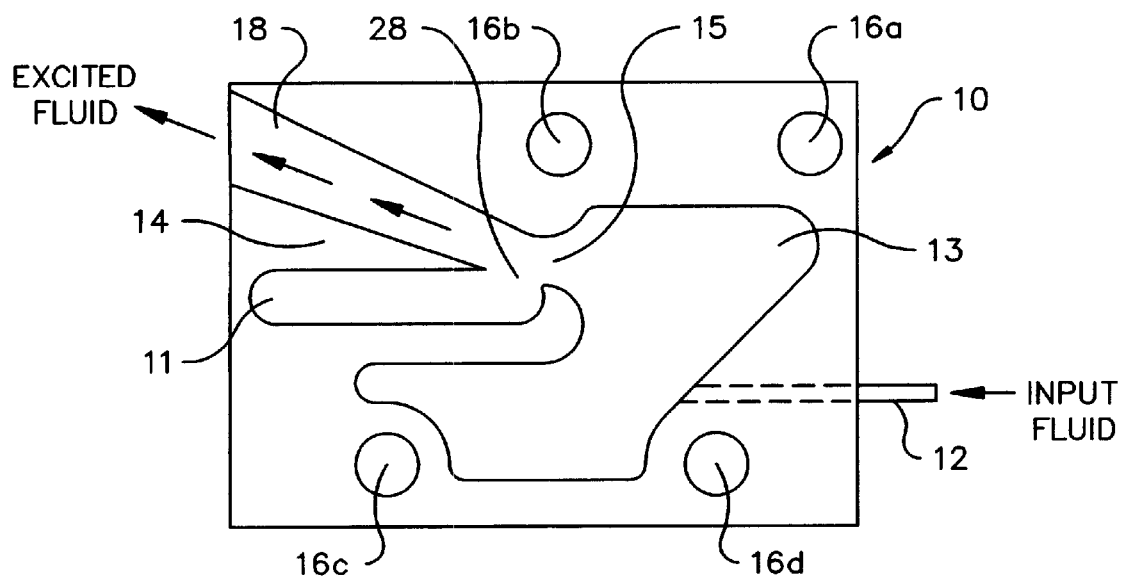
FIG. 2 is a section view of the present invention showing an actuator with inlet port.

Referring now to FIG. 2, the present invention, an actuator 10, is comprised of an inlet port 12, a stagnation chamber 13, a throat 15, a resonance cavity 11, and an ejector port 18. Ejector port 18 and resonance cavity 11 are oriented at an oblique angle so to form a wedge 14. Preferably, stagnation chamber 13, resonance cavity 11, throat 15, and ejector port 18 are machined into a planar or nearly planar element. However, actuator 10 may be cast or molded into a variety of planar and non-planar shapes. Actuator 10 materials include but not limited to metal, plastic, and ceramic.

Figure 3:
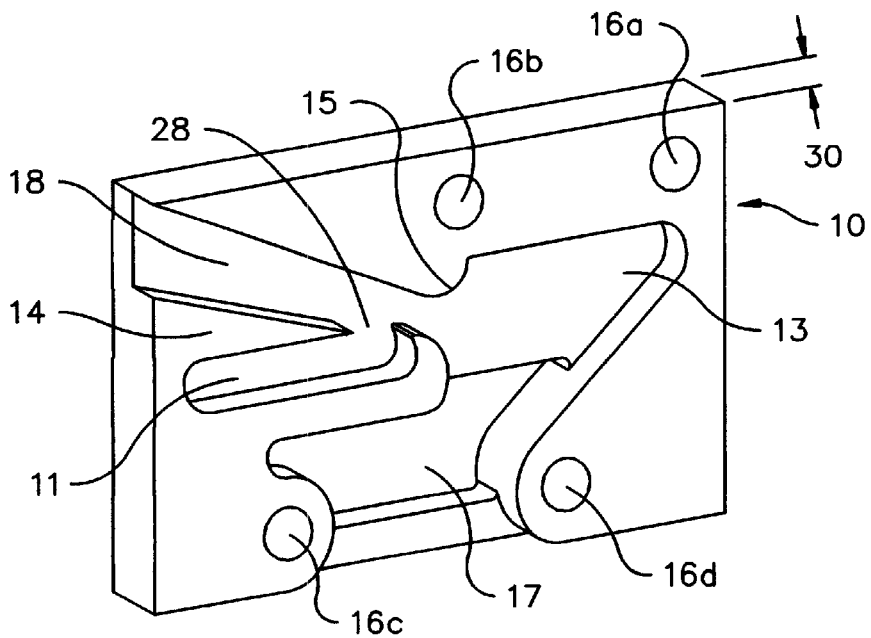
FIG. 3 is a section view of the present invention showing an actuator with plenum.

Fluid flow between inlet port 12 and ejector port 18 is restricted to stagnation chamber 13, resonance cavity 11, throat 15, and ejector port 18 via one or more planar or nearly-planar cover plates 20. For example, elements comprising the actuator 10 may be machined to a depth less than the thickness of the plate thereby providing confinement along one side, as shown in FIGS. 2 and 3. A cover plate 20 is thereafter placed over stagnation chamber 13, throat 15, resonance cavity 11, wedge 14, and ejector port 18 and secured via mechanical fasteners, adhesive, or other techniques understood in the art. Alternately, an actuator 10 may require two cover plates 20 when the width 30 of stagnation chamber 13, throat 15, resonance cavity 11, and ejector port 18 are equal to the plate thickness. A seal comprised of a gasket, calk, or adhesive, examples including RTV silicon and epoxy, may be applied between actuator 10 and cover plate 20 to prevent fluid leaks.

Figure 4:
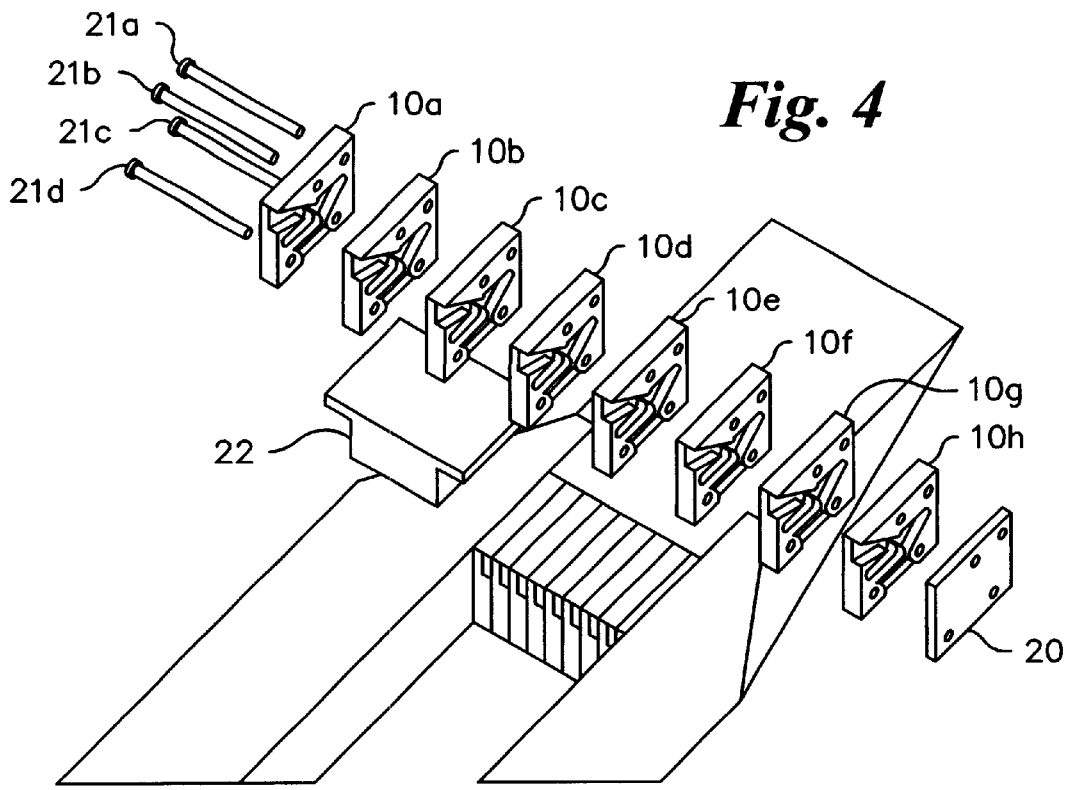
FIG. 4 is an exploded view of a linearly-arranged, multi-actuator embodiment.

Fluid flow into the stagnation chamber 13 is provided by an inlet port 12 or plenum 17. Inlet port 12 may be comprised of a tube-like element attached to the actuator 10 so that fluid freely flows into the stagnation chamber 13 from an external source, as shown in FIG. 2. A gasket, calk, or adhesive is placed along the contact surface between inlet port 12 and actuator 10 so to prevent fluid leaks. Alternately, fluid may be communicated from a single source through a plenum 17 comprised of a cavity within the stagnation chamber 13 of each actuator 10, as shown in FIG. 4. While various shapes are possible for the stagnation chamber 13, the stagnation chamber 13 should be sufficiently voluminous so to facilitate required mass flow rate and pressure within the actuator 10.

The throat 15 communicates fluid within the stagnation chamber 13 to resonance cavity 11, wedge 14, and ejector port 18. While various throat 15 geometries are possible, a convergent-divergent arrangement to so first compress then expand fluid as it traverses the throat 15 was preferred. The throat 15 should be aligned with wedge 14 so that a portion of the fluid flows into the ejector port 18 and the remainder into the resonance cavity 11. The partitioning of fluid flow between ejector port 18 and resonance cavity 11 is application dependent.

Fluid flow between throat 15 and wedge 14 should be of sufficient velocity, preferably turbulent, so to allow for the side-to-side oscillation of fluid about the wedge 14 thereby producing edge tones. The frequency of edge tones is tailored to optimize interaction with the pulsating operation of the resonance cavity 11. Edge tone frequency ($f_e$) is approximated by the equation $$f_e = (nv)/x$$

where v is the velocity of fluid approaching the wedge 14, x is the distance between throat 15 and wedge 14, and n is a constant in the range $0 < n \leq 1$. In preferred embodiments, resonance and edge tones are produced having nearly identical frequency characteristics.

Again referring to FIG. 2, the resonance cavity 11 is an elongated cavity with an opening 28 disposed between wedge 14 and throat 15 oriented in the direction of the ejector port 18. While various cavity profiles are possible along the resonance cavity 11, preferred embodiments had a constant height, horizontally disposed, and obliquely oriented with respect to the ejector port 18.

The ejector port 18 controls the ejection of excited fluid from the actuator 10. Ejector port 18 may be comprised of a constant height cavity or tapered so to allow expansion of the excited fluid as it traverses the length of the ejector port 18, the latter shown in FIG. 2.

The actuator 10 receives a fluid, typically a gas including but not limited to air and helium, thereafter excited producing a pulsed jet at a desired frequency, pressure, and velocity. For turbulence control applications, the gas may be preheated above the ambient temperature prior to excitation within the actuator 10. Preferred gases have a sound speed greater than air. The dimensions of stagnation chamber 13, resonance cavity 11, throat 15, and ejector port 18 are application and performance dependent. A device having a stagnation chamber 13 pressure of 50 psi and dimensions listed in TABLE 1 excited a fluid consisting of ambient temperature air to a velocity signal with a dominant frequency at 10 kHz and a pressure signal with dominant frequencies at 10 kHz and 25 kHz.

TABLE 1

| Component | Dimension | Value |
| --- | --- | --- |
| Input Port | Inner Diameter (mm) | 5 |
| Stagnation Chamber | Volume (mm³) | 200 |
| Throat | Height (mm) | 1.6 |

TABLE 1-continued

| Component | Dimension | Value |
| --- | --- | --- |
| Resonance Cavity | Opening (mm) | 1.7 |
|  | Length (mm) | 10 |
|  | Height (mm) | 1.6 |
| Ejector Port | Length (mm) | 15 |
|  | Entrance Height (mm) | 1.8 |
|  | Exit Height (mm) | 4.8 |

While single actuator 10 embodiments are described above, multi-actuator assemblies 9 are also possible. Referring now to FIG. 4, several actuators 10 similar to the design shown in FIG. 3 are arranged in a linear embodiment. Actuators 10*a*–10*h* are mechanically fastened via fasteners 22*a*–22*d*, examples including but not limited to bolts and rivets, through mutually aligned holes 16*a*–16*d*. A cover plate 20 is attached to the last actuator 10*h* so to confine fluid flow as described above. Contact between actuators 10 confines fluid flow within the device. A seal comprised of a gasket, calk, or adhesive, examples including RTV silicon and epoxy, may be required to prevent leakage between actuators 10, as well as between actuator 10 and cover plate 20 terminating the linear embodiment.

Figure 5:
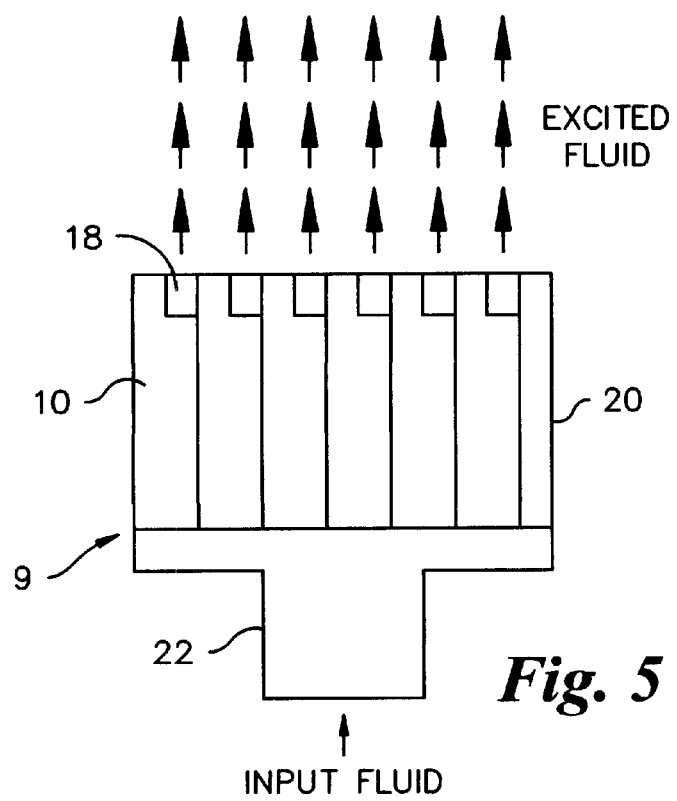
FIG. 5 is a side elevation view of a linearly-arranged, multi-actuator embodiment showing ejector ports and fluid flow.

In a typical multi-actuator assembly 9, a duct 22 provides a single source of fluid flow that is communicated to and between the actuators 10. FIG. 5 shows a multi-actuator assembly 9 having a single duct 22 directing fluid into a plurality of actuators 10 and thereafter expelling the excited fluid from ejector tubes 18. The duct 22 may be mechanically fastened to the multi-actuator assembly 9 via techniques understood in the art and thereafter sealed to prevent leakage, as described above.

Figure 6:
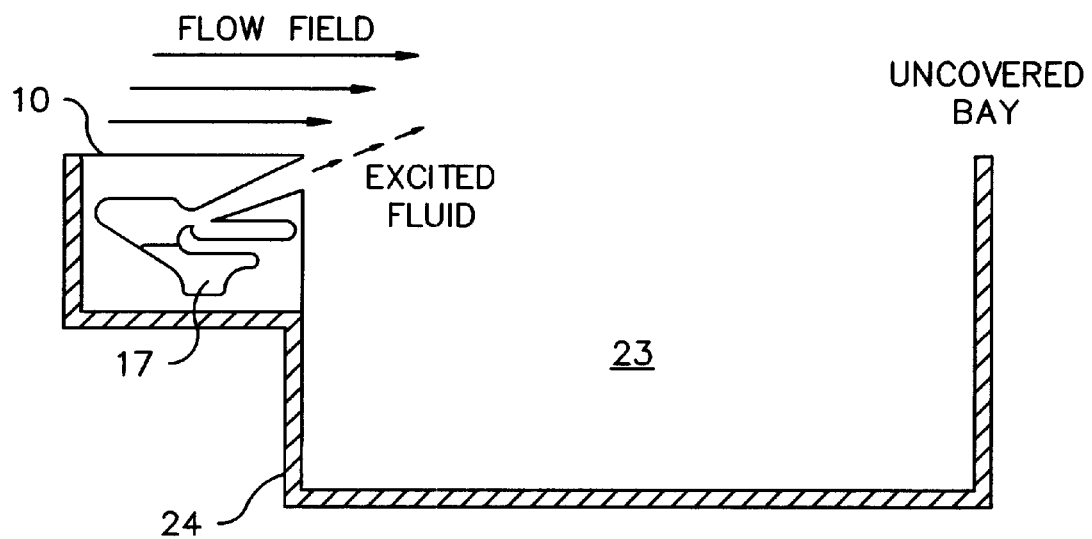
FIG. 6 is a section view showing present invention adjacent to an uncovered bay in a turbulence control application.
Figure 7:
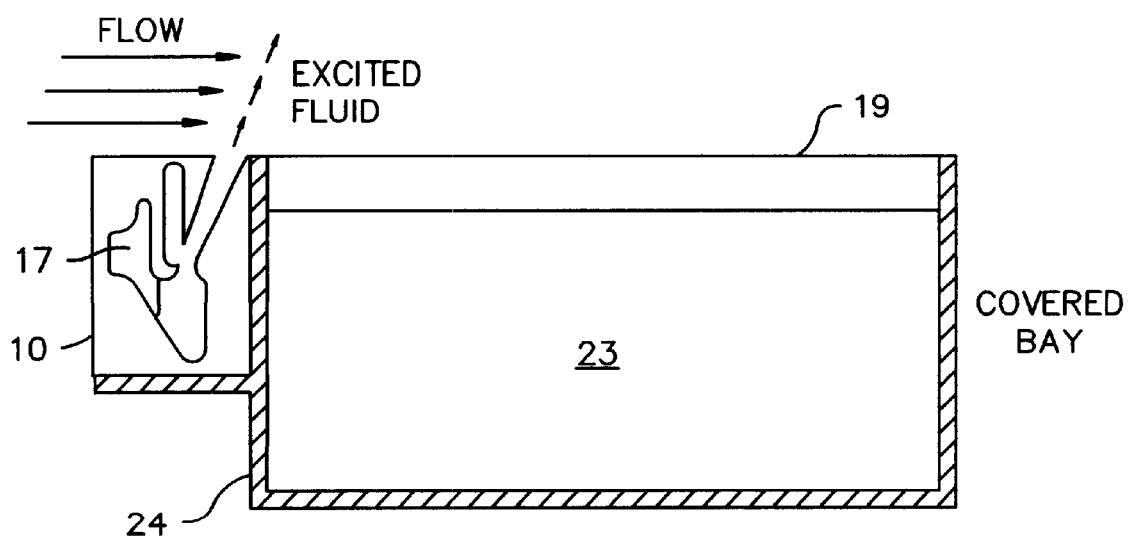
FIG. 7 is a section view showing present invention adjacent to a covered bay with aero-optic cover in a turbulence control application.

The multi-actuator assembly 9 shown in FIGS. 4 and 5 are applicable to suppressing turbulence within either an open or a covered bay. Referring now to FIG. 6, an actuator 10 is shown ejecting an excited fluid into a flow field above a cavity 23 without cover. Alternately, FIG. 7 shows an actuator 10 ejecting an excited fluid into a flow field above a cavity 23 having an aero-optic cover 19. In both embodiments, the multi-actuator assembly 9 is fixed via mechanical means understood within the art to the structure 24 adjacent to the cavity 23 so to cause interaction between excited fluid and flow field passing over the structure 24. An exemplary structure 24 is an aircraft fuselage. Preferably, actuators 10 are mounted so as to not physically interfere with the flow field, however positioned so to direct excited fluid directly into the flow field.

Figure 8:
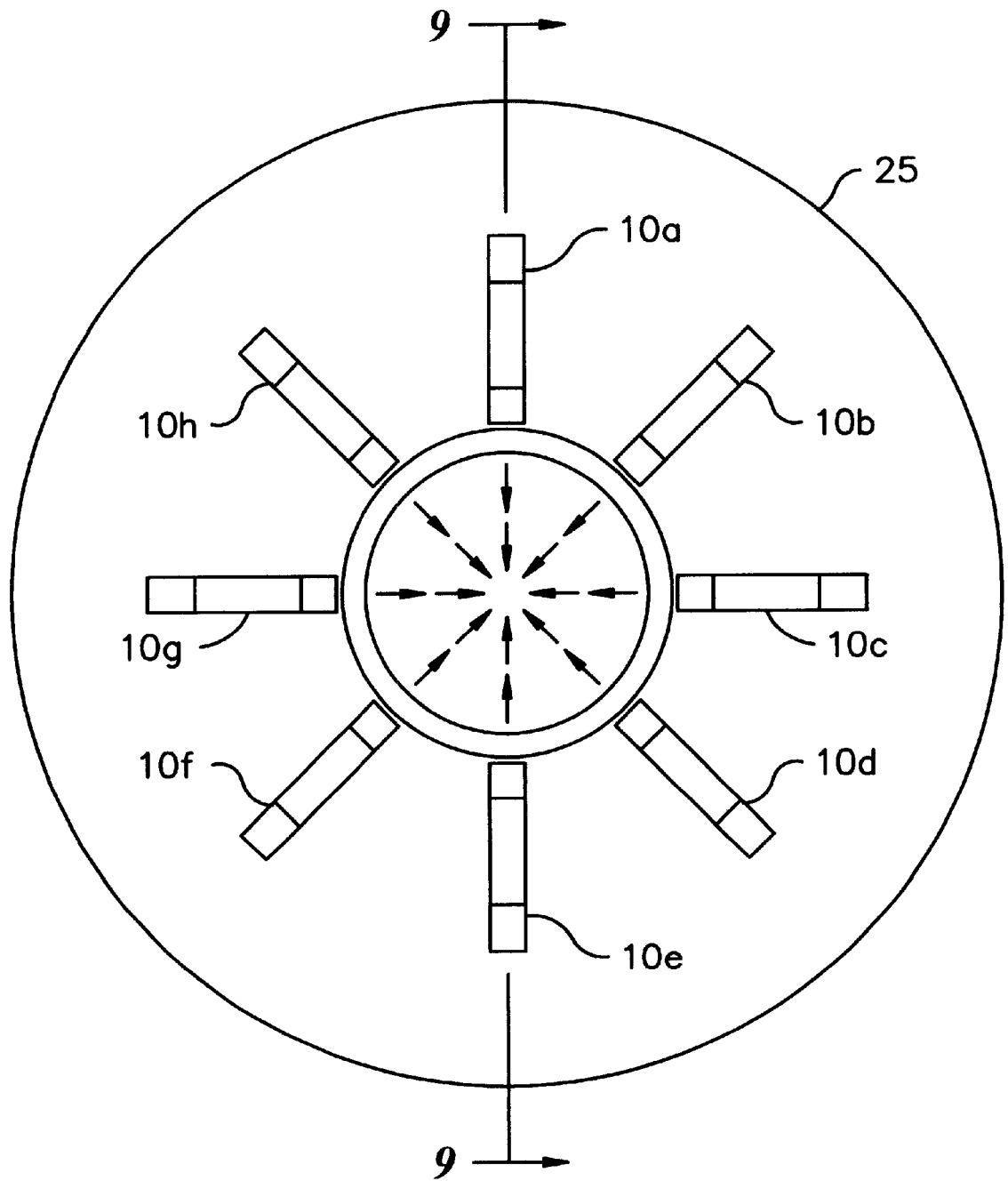
FIG. 8 is an elevation showing a plurality of actuators arranged in a circular pattern about a nozzle.
Figure 9:
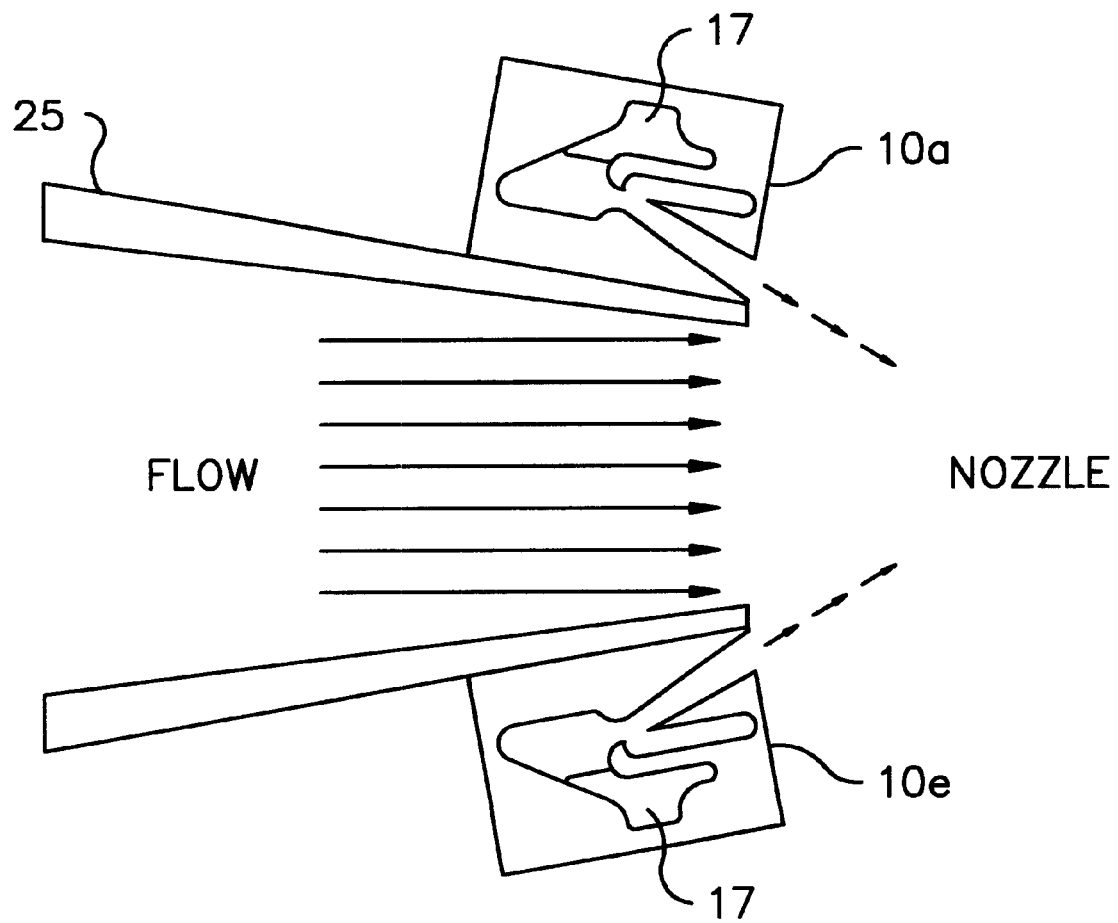
FIG. 9 is a section view showing excited fluid from actuators impinging exit flow from a nozzle.

Referring now to FIG. 8, a plurality of actuators 10 are arranged about the exterior surface of a nozzle 25 so to inject excited fluid into the flow field entering or exiting the nozzle 25. Actuators 10 may be separately disposed as shown in FIG. 8 or arranged in a continuous pattern so that each actuator 10 contacts two other actuators 10. Actuators 10 are fixed via techniques understood in the art and project a plurality of excited fluid streams into the flow field exiting the nozzle 25, as represented in FIG. 9. Fluid flow into the actuator 10 may be provided via an inlet port 12 communicating independently with each stagnation chamber 13, as described in FIG. 2, or a single fluid feed embodiment wherein fluid flow is directed through a plenum 17, as described in FIG. 3. In the latter embodiment, actuators 10 are mechanically attached and sealed as described above. Preferably, actuators 10 are mounted so as to not physically interfere with the flow field, however positioned so to direct excited fluid directly into the flow field.

Figure 10:
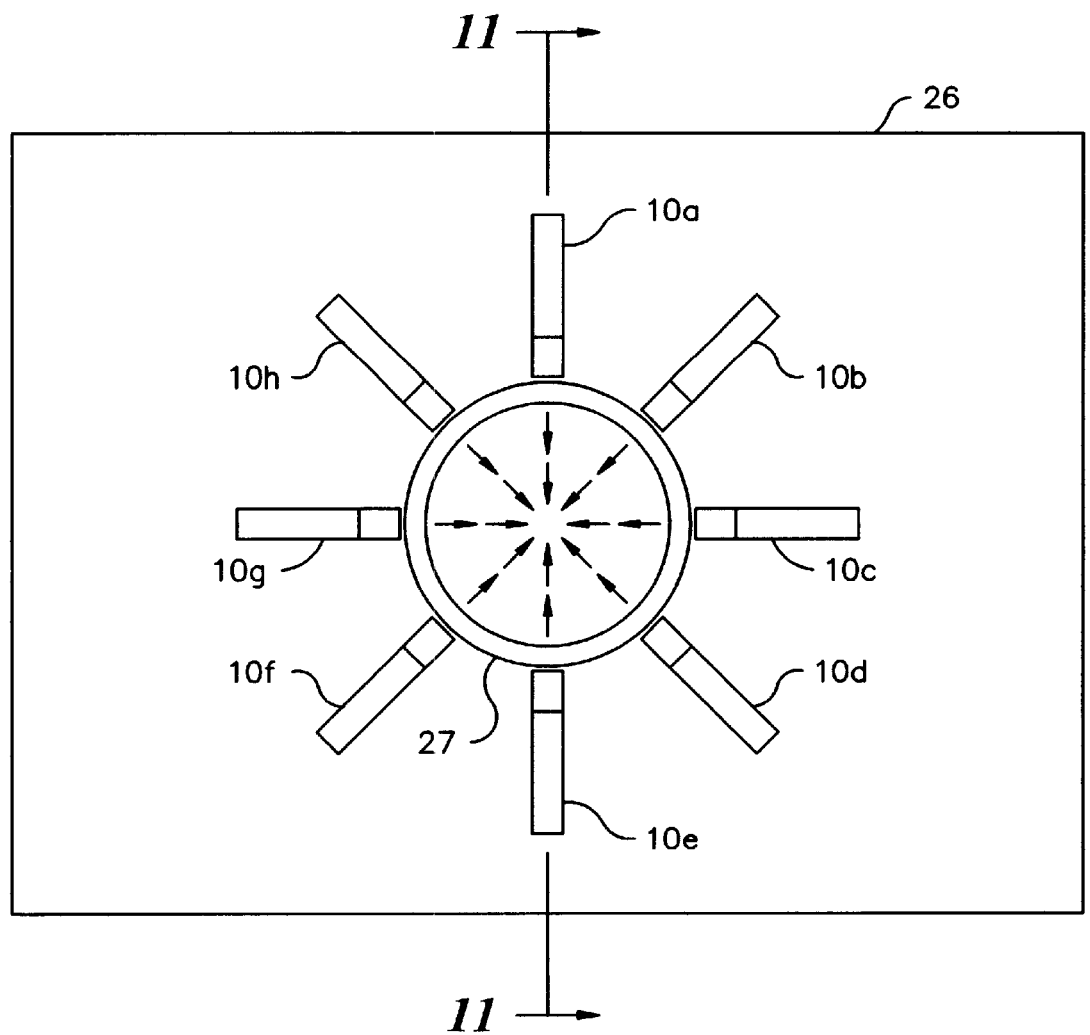
FIG. 10 is a top elevation view showing a plurality of actuators arranged in a circular pattern about an aero-optics cover in a turbulence control application.
Figure 11:
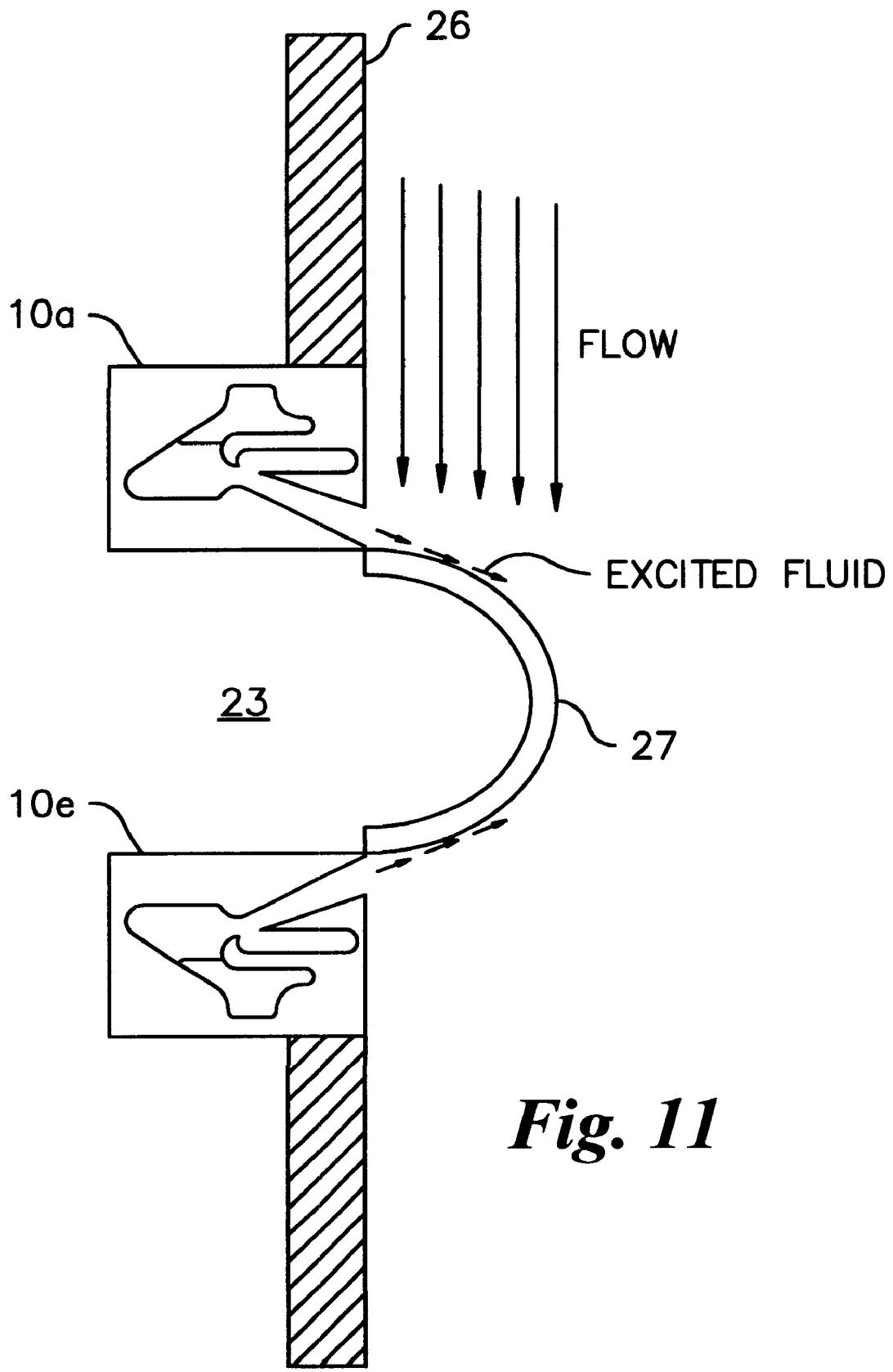
FIG. 11 is a section view showing excited fluid from actuators impinging flow adjacent to an aero-optic cover.

Referring now to FIG. 10, a plurality of actuators 10 are arranged in a circularly disposed fashion about an aero-optic cover 27 so that ejector ports 18 project excited fluid onto the aero-optic cover 27. A typical aero-optic cover 27 is comprised of an optically transmissible material as is understood in the art. Actuators 10 may be separately disposed as shown in FIG. 10 or arranged in a continuous pattern so that each actuator 10 contacts two other actuators 10. Actuators 10 are fixed to the structure 26 via techniques understood in the art and project excited fluid into the flow field so to alter its characteristics. Fluid flow into the actuator 10 may be provided via an inlet port 12 communicating independently with each stagnation chamber 13, as described in FIG. 2, or a single fluid feed embodiment wherein fluid flow is directed through a plenum 17, as described in FIG. 3. In the latter embodiment, actuators 10 are mechanically attached and sealed as described above. Preferably, actuators 10 are mounted so as to not physically interfere with the flow field, however positioned so to direct excited fluid directly into the flow field.

The description above indicates that a great degree of flexibility is offered in terms of the present invention. Although the present invention has been described in considerable detail with reference to certain preferred versions thereof, other versions are possible. Therefore, the spirit and scope of the appended claims should not be limited to the description of the preferred versions contained herein.

What is claimed is:

1. A method for augmenting frequencies in a fluid stream comprising the steps of:
    (a) exciting said fluid stream via resonance;
    (b) exciting said fluid stream via edge tones; and
    (c) coupling said resonance and said edge tones within said fluid stream.

2. A flow control actuator for exciting a fluid comprising:
    (a) a stagnation chamber;
    (b) an inlet port attached to said stagnation chamber, said inlet port communicating said fluid to said stagnation chamber;
    (c) a resonance cavity;
    (d) an ejector port directing said fluid from said flow control actuator;
    (e) a wedge disposed between said resonance cavity and said ejector port; and
    (f) a throat disposed between said wedge and said stagnation chamber, said
throat directing said fluid across said wedge thereby partitioning flow of said fluid between said ejector port and said resonance cavity.

3. The flow control actuator of claim 2, wherein said fluid has a sound speed greater than air.

4. The flow control actuator of claim 2, wherein said fluid is heated.

5. The flow control actuator of claim 2, wherein said fluid is helium.

6. A flow control apparatus comprising at least two flow control actuators for exciting a plurality of fluids thereafter ejecting said fluids into a flow field, each said flow control actuator comprising:
    (a) a stagnation chamber;
    (b) an inlet port attached to said stagnation chamber, said inlet port communicating one said fluid to said stagnation chamber;
    (c) a resonance cavity;
    (d) an ejector port directing one said fluid from said flow control actuator;
    (e) a wedge disposed between said resonance cavity and said ejector port; and
    (f) a throat disposed between said wedge and said stagnation chamber, said
throat directing one said fluid across said wedge thereby partitioning flow of one said fluid between said ejector port and said resonance cavity.

7. The flow control apparatus in claim 6, wherein said flow field and said fluids pass over a cavity.

8. The flow control apparatus in claim 6, wherein said flow field and said fluids pass over an aero-optic cover.

9. The flow control apparatus in claim 6, wherein said flow field and said fluids interact adjacent to a nozzle.

10. The flow control apparatus in claim 6, wherein said actuators are linearly arranged.

11. The flow control apparatus in claim 6, wherein said actuators are circularly arranged.

12. A flow control apparatus comprising at least two flow control actuators for exciting a fluid thereafter ejecting said fluid into a flow field, each said flow control actuator comprising:
    (a) a stagnation chamber;
    (b) a plenum communicating said fluid into said stagnation chamber of each said flow control actuator;
    (c) a resonance cavity;
    (d) an ejector port directing said fluid from said flow control actuator;
    (e) a wedge disposed between said resonance cavity and said ejector port; and
    (f) a throat disposed between said wedge and said stagnation chamber, said
throat directing said fluid across said wedge thereby partitioning flow of said fluid between said ejector port and said resonance cavity.

13. The flow control apparatus in claim 12, wherein said flow field and said fluid pass over a cavity.

14. The flow control apparatus in claim 12, wherein said flow field and said fluid pass over an aero-optic cover.

15. The flow control apparatus in claim 12, wherein said flow field and said fluid interact adjacent to a nozzle.

16. The flow control apparatus in claim 12, wherein said actuators are linearly arranged.

17. The flow control apparatus in claim 12, wherein said actuators are circularly arranged.

* * * * *